UNITED STATES PATENT OFFICE.

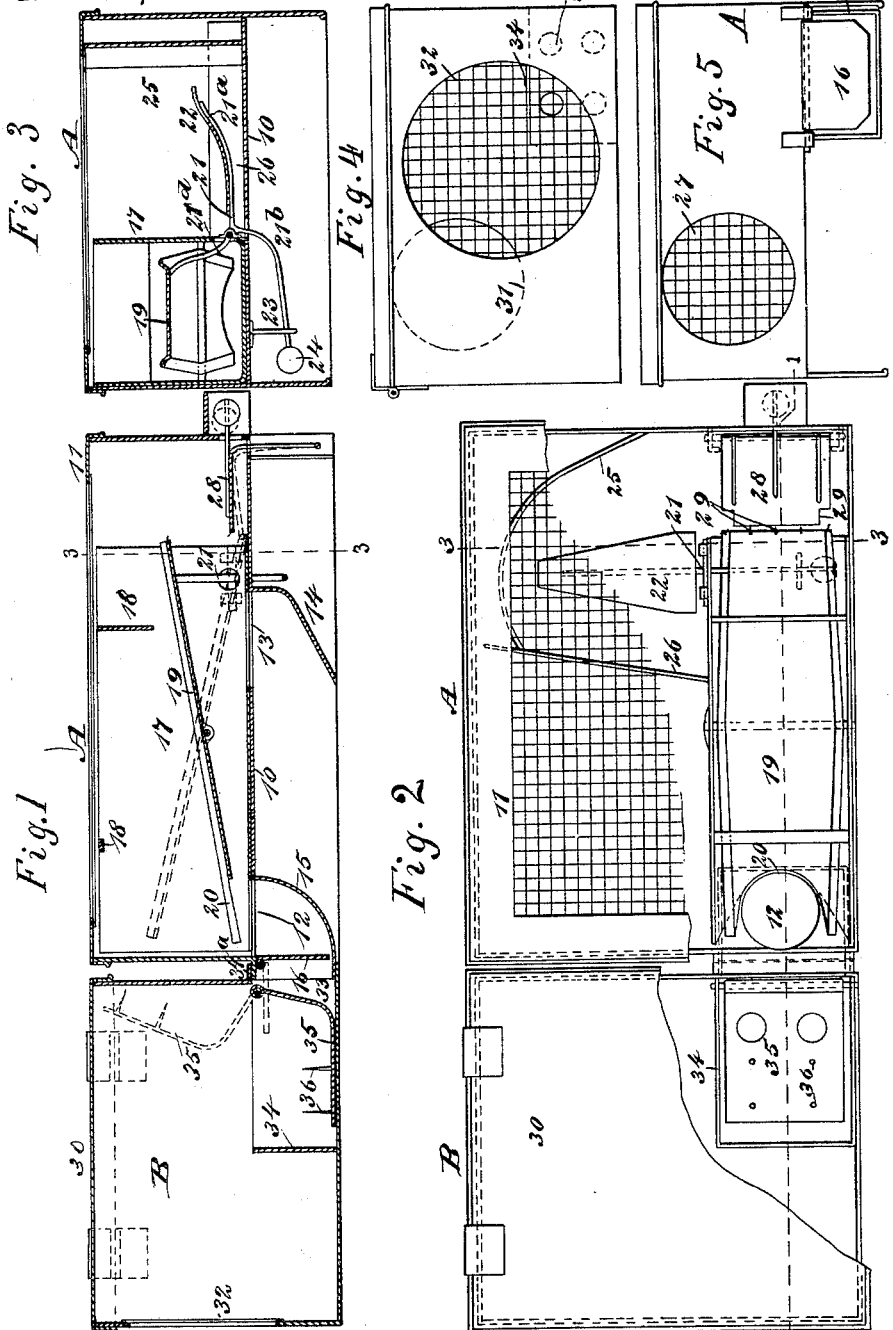

JOSEPH KLAR AND FRANK H. HALL, OF ANNA, ILLINOIS.

ANIMAL-TRAP.

SPECIFICATION forming part of Letters Patent No. 477,126, dated June 14, 1892.

Application filed November 12, 1891. Serial No. 411,707. (Model.)

*To all whom it may concern:*

Be it known that we, JOSEPH KLAR and FRANK H. HALL, of Anna, in the county of Union and State of Illinois, have invented a new and useful Improvement in Animal-Traps, of which the following is a full, clear, and exact description.

Our invention relates to an improvement in traps, especially to that class of traps adapted to catch rats and mice, and has for its object to provide a trap of simple, durable, and economic construction, into which when an animal enters and takes the bait a pivoted chute or runway will be carried downward to close the inlet-opening, and whereby when the animal seeks to escape it is compelled to travel over this runway or chute, and in so doing will set the trap for another victim.

Another object of the invention is to provide a means whereby it is rendered impossible for the animal to raise the chute or runway and uncover the inlet-opening while in front of the chute.

Another object of the invention is to provide in conjunction with the trap a cell and a connection between the trap and cell so constructed that the animal escaping from the trap may readily enter the cell, but will find it impossible to return to the trap.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a vertical longitudinal section through the trap, taken on the line 1 1 of Fig. 2. Fig. 2 is a plan view of the trap and cell, the top of both being partially broken away. Fig. 3 is a transverse section taken practically on the lines 3 3 of Figs. 1 and 2. Fig. 4 is an end view of the cell of the trap, and Fig. 5 is a view of the outer end of the trap proper.

The trap may be constructed of any suitable material. Ordinarily, however, sheet-metal is employed. The trap proper, or what may be called the "body" A of the trap, is preferably made rectangular in general contour and is of greater length than width. Below the center of the body a horizontal partition 10 is formed, and the body is provided with a top 11, removable therefrom and preferably having a hinged connection therewith. The major portion of the top or cover 11 is ordinarily constructed of a wire netting or gauze, in order that the interior of the body of the trap may be rendered visible.

In the horizontal partition or bottom 10 of the trap, at one corner of the rear end, an opening 12 is produced, preferably circular in general contour, and near the center of the bottom a similar opening 13 is made. Near the front wall of the opening 13 a shield 14 is secured, which is carried vertically downward for a portion of its length and then at an inclination rearward, terminating on a level with the lower edges of the side walls, as is best shown in Fig. 1, and the opening 12 is surrounded by a chute 15, which is curved downward to the rear end of the trap. The end of the chute is normally closed by a swing-door 16, which drops by gravity. The door is capable of being opened outward; but when an attempt is made to push it inward it binds against the chute, and an entrance through the chute from the outside of the trap-body is thereby prevented.

A vertical partition 17 is constructed upon the floor of bottom 10 of the trap-body, said partition extending longitudinally of the body and being of a height essentially the same as the height of the inner chamber of the trap. The partition is located near the inner edges of the openings 12 and 13 and extends from the rear walls of the trap-body past the center thereof, whereby a space is created between the forward end of the partition and the forward end of the body of the trap, as is likewise best shown in Fig. 1. The partition is ordinarily braced by suitable straps 18, extending from it to the contiguous side of the trap-body, and between the said side of the trap-body and the partition a chute or runway 19 is pivoted some distance above the floor or bottom 10. The chute is pivoted nearer its rear than its forward end, and the forward end is rendered somewhat heavier than the rear end, the latter end being provided with a concavity 20, whereby this end of the chute or runway partially encircles the opening 12.

The chute or runway usually consists of a strip of metal having its side edges provided with flanges. The outer end of the chute or runway is held in an elevated position, as shown in Fig. 1, through the medium of a lever 21, which lever is fulcrumed in an opening produced in the partition 17 near the forward end thereof and near the bottom 10 of the trap. The lever comprises an arm $21^a$, which extends from the fulcrum transversely across and above the bottom of the trap-body, and this member supports a bait-platform 22, as the bait is intended to be placed in front of it. The lever comprises, further, a second arm $21^b$, which passes from the fulcrum downward through an opening in the floor or bottom 10 and through a staple 23, or the equivalent thereof projected downward from the floor, and the outer end of this arm is provided with a weight 24. The lever further comprises a tongue $21^d$, which extends from the fulcrum upward within the space between the partition 17 and the side wall of the trap-body, the said tongue being so bent that when the lever is held in its normal position by the weight 24 the tongue will engage with the outer end of the chute or runway and maintain it in an elevated position.

The bait-platform is partially surrounded by a semicircular partition 25, which connects with the outer end of the trap-body, this partition being about the height of the inner chamber, and a lower partition 26, which extends from the outer face of the longitudinal partition 17 to a connection with the rear edge of the curved partition, as is best shown in Fig. 2. The height of this partition 26 enables an animal to readily pass over it and look through the gauze-covered opening 27 in the back of the trap.

Immediately in front of the pivoted runway or chute 19 a pivoted and counterbalanced platform 28 is located, the weight attached to the platform normally holding it a slight distance above the floor 10 of the trap, as shown in Fig. 1, and when the platform 28 is in its normal position the pivoted chute or runway is free to move upward or downward. When, however, the bait-platform has been trodden upon by the animal and the chute or runway released from the tongue of the angle-lever 21, connected with the bait-platform, the forward end of the chute drops, and should the animal turn to find an exit through the opening through which he entered he must of necessity tread upon the counterbalance-platform 28, and the said platform will thereupon be pressed downward upon the forward end of the chute or runway 19, rendering it impossible for the animal to raise the latter in any manner, and to prevent such an occurrence should the pivoted platform not operate the forward end of the chute or runway is provided with a series of sharp pins or points 29.

The compartment B, which we denominate a "cell," is used in connection with the body of the trap. The cell is also preferably rectangular and is constructed of sheet metal, being provided with a removable or hinged top 30. The cell or compartment at its inner end, or that end facing the inner end of the trap, is provided with a screened opening 31, (shown in dotted lines, Fig. 4,) the said opening being located in the upper left-hand corner of the cell, so that when the cell and the body of the trap are connected the opening 31 in the cell will be opposite the opening 27 in the trap. A large screened opening 32 is preferably produced in the opposite end of the cell portion of the trap in order that the contents may be rendered visible.

At the lower right-hand corner of the inner end of the sill-section of the trap an opening 33 is made, surrounded by a flange $34^a$, which opening is adapted to receive the rear end of the chute 15 of the trap proper, as shown in in Fig. 1, and by this means a connection is effected between the cell and the trap.

Within the cell around the opening 33 a box-like compartment 34 is erected, and within this box-like compartment an essentially angular gate or door 35 is pivoted, the pivotal point of the gate or door being at the upper end of its vertical member, the horizontal member resting normally upon the floor of the cell within the said compartment, and when in its normal position the gate or door closes the cell opening 33. This gate or door may be lifted from outside of the cell, but cannot be raised by an animal when confined within the cell.

To prevent the attempt on the part of the animal to elevate the door, its upper surface is provided with a series of spikes or teeth 36. The rear wall of the compartment 34 is preferably provided with a series of apertures 37, as shown in Fig. 4, in order that an animal when entering the compartment may see that there is more room within the cell than in the compartment.

In operation, the chute or runway having been set—that is, elevated by the tongue of the lever 21, carrying the bait-platform—the animal enters the trap through the opening 13, and passing out beneath the elevated end of the chute or runway treads upon the counterbalance-platform 28, and as it drops with it the animal quickly leaves it and approaches the bait-platform. To reach the bait, it is necessary that the animal should place its fore feet upon the platform, thus pressing the said bait-platform downward and releasing the chute or runway from engagement with the tongue 21 of the lever supporting the platform, at which time the inner end of the runway or chute will drop by gravity and prevent the escape of the animal from the trap. The animal so imprisoned can see into the cell by looking through the screened opening 27, and, if desirous of entering the same, the animal will have to pass up over the chute or runway, and before doing so must tread upon the balance-platform 28, which platform when depressed will lock the forward end of the runway in its lower position. In passing over the runway the animal depresses its rear end and elevates the forward end, and the lower member of the lever 21 is thereupon carried downward by the weight 24, and its tongue 21$^d$ immediately engages with the elevated end of the runway and maintains it in that position, thus setting the bait-platform for the next animal that may enter. An animal passing over the runway will pass down through the opening 12 in the trap into the chute or passage 15 and finds an escape therefrom by pressing the gate 16 outward. After doing this the gate 35 will be encountered and that in turn is lifted, whereupon the entrapped animal is imprisoned in the cell B.

Having thus described our invention, we claim as new and desire to secure by Letters Patent—

1. In an animal-trap, the combination, with a covered chamber provided with two openings in its bottom, one near the center and the other at one end, an inclined platform leading up to the central opening, and a chute leading from the end opening out through the end of the trap, the said end opening being normally closed by a swing-door, of a chute or runway pivoted above the central opening and leading to the end opening in the bottom of the trap, a cell connected with the gated end opening of the trap, and a bait-platform provided with an extension normally engaging with the runway or chute, substantially as described.

2. In an animal-trap, the combination, with an inclosed chamber, the bottom whereof is provided with a central opening and with an opening near one end, the said chamber being also provided with an opening in its end below its bottom, a passage-way connecting the end opening at the bottom and the end opening below it, the lower end opening being normally closed by a swing-door, of a cell connected with the gated opening of the trap-chamber and provided also with a swing-door opposite said opening, a runway or chute pivoted at one side of its center above the floor of the trap-chamber over the central opening and leading to the end opening, a weighted bait-platform provided with an extension normally engaging with and elevating one end of the chute or runway, and a second weighted platform located in front of the elevated end of the runway, the weighted platform being adapted as a lock for the runway when compressed, as and for the purpose specified.

3. In an animal-trap, the combination, with a trap-chamber having an opening in its bottom near the center and an opening near one end, also in the bottom, connected by a passage-way with the opening in the end below the bottom, the latter opening being provided with a gravity-door, and a cell-compartment connected with the trap-chamber at its gated opening, the cell being also provided with a drop-door, of a chute or runway pivoted at one side of its center within the trap-chamber above the bottom and over the central opening leading to the end opening in the bottom of said chamber, and a weighted bait-platform provided with an extension adapted to normally elevate one end of the runway or chute and depress the opposite end, as and for the purpose set forth.

4. An animal-trap provided with an inlet and an exit opening, a trough or runway fulcrumed above said openings, covering one and leading to the other, and a trip device having connection with one end of the runway, substantially as described.

5. An animal-trap provided with an inlet and an exit opening, a trough or runway fulcrumed at one side of its center above the openings, covering the inlet and leading to the exit opening, and a pivoted weighted bait-platform normally supporting the longer end of the runway, substantially as described.

6. An animal-trap provided with an inlet and an outlet opening, a trough or runway fulcrumed above the openings, covering the inlet and leading to the outlet opening, a pivoted weighted bait-platform normally supporting the runway at a distance from the inlet-opening, and a locking-platform located in front of one end of the runway, substantially as described.

JOSEPH KLAR.
FRANK H. HALL.

Witnesses:
A. J. HUNSAKER,
K. F. GRACE.